United States Patent [19]

Anderton et al.

[11] 4,082,588
[45] Apr. 4, 1978

[54] METAL PROTECTING LEAD/PLASTIC LAMINATE

[75] Inventors: William Arthur Anderton; Richard Benjamin Hollis Sewell, both of Victoria, Canada

[73] Assignee: Her Majesty the Queen in right of Canada as represented by the Minister of National Defence, Canada

[21] Appl. No.: 760,678

[22] Filed: Jan. 19, 1977

[30] Foreign Application Priority Data

Feb. 20, 1976 Canada .................................. 246163

[51] Int. Cl.² ............................................... E04B 1/00
[52] U.S. Cl. .................................... 156/71; 156/195; 156/327; 428/242; 428/461
[58] Field of Search ......................... 156/71, 195, 327; 106/15 AF; 428/461, 242

[56] References Cited

U.S. PATENT DOCUMENTS

| | | | |
|---|---|---|---|
| 3,323,965 | 6/1967 | Hanie et al. | 156/244 |
| 3,582,452 | 6/1971 | Britton | 428/209 |
| 3,600,268 | 8/1971 | Hori et al. | 428/215 |
| 3,607,614 | 9/1971 | Mackay et al. | 156/327 |
| 3,719,551 | 3/1973 | Radtke et al. | 156/244 |
| 3,740,958 | 6/1973 | Cadwell | 156/195 |
| 3,761,334 | 9/1973 | Zondek | 156/71 |
| 3,912,519 | 10/1975 | Takaoi et al. | 106/15 AF |

*Primary Examiner*—Edward G. Whitby
*Attorney, Agent, or Firm*—Stevens, Davis, Miller & Mosher

[57] ABSTRACT

A method of protecting surfaces against deterioration by environmental factors is described. In a particular aspect of this invention a metal surface subject to electrochemical corrosion has applied to it a metal-plastic laminate comprising (a) a foil of corrosion-resistant metal, in particular lead; (b) a plastic film ranging up to about 20 mils in thickness, bonded to one surface of the metal foil, either by "extrusion coating" or by means of a suitable adhesive; and (c) a coating of pressure-sensitive adhesive on the opposite surface of the metal foil. (In some cases the outer plastic film can be omitted.) The laminate is bonded to the metal substrate by means of the pressure-sensitive adhesive. This method, when used in conjunction with a coating of anti-fouling paint, is effective for protecting the hull of a marine vessel both against corrosion and fouling by marine organisms such as barnacles; and the invention is also effective in protecting wooden vessels against marine borers. The method is relatively inexpensive and easy to carry out, and requires only a minimum of surface preparation of the substrate.

32 Claims, 4 Drawing Figures

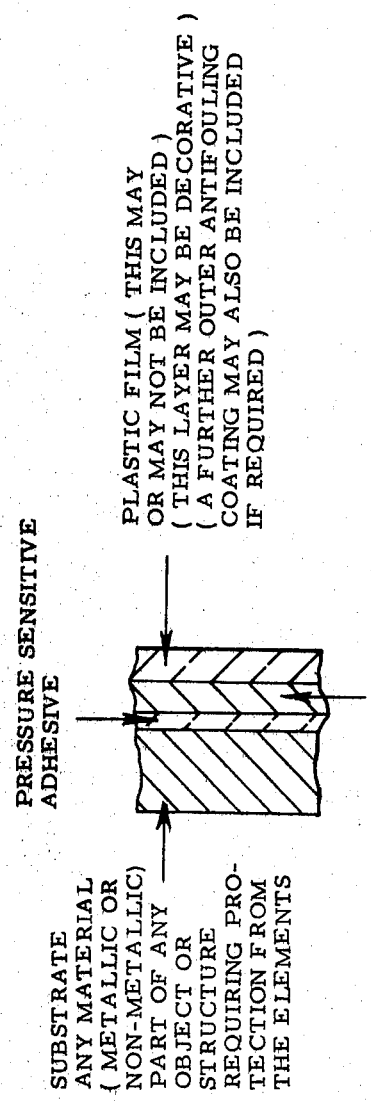

METAL PROTECTING LEAD/PLASTIC LAMINATE

The present invention relates generally to the protection of surfaces against deterioration by environmental factors, and more particularly to the protection of metal surfaces against corrosion. More specifically, the invention relates to an improved method of protecting metals subject to electrochemical corrosion against such corrosion, employing a laminate of a corrosion-resistant metal and a plastic film as a coating for the metal substrate.

In another aspect this invention relates to the protection of the hulls of marine vessels against fouling by marine organisms such as barnacles, as well as the protection of the hulls of wooden vessels against marine borers.

Corrosion, more commonly and familiarly known as rusting, is broadly defined as the destructive alteration of a metal by reaction with its environment. A good discussion of the nature of this phenomenon is found in an article in the Oct. 7, 1976 issue of *Machine Design*, pages 108–113, entitled "Waging War on Rust, Part 1: Understanding Rust". The economic losses incurred as a result of the depreciation of steel and other metals by electrochemical corrosion are very great. An idea of the economic importance of corrosion can be obtained by estimates that the annual cost of corrosion due to losses that result from it and the expenses of preventing it amounts to at least $30,000,000,000 per year for the world at large. Thus it will be appreciated that measures to reduce such costs are of considerable economic significance.

Numerous methods are known for combatting electrochemical corrosion. One of the most commonly employed ways of doing this is to apply a paint or enamel or other types of protective coating to the metal surface. Or in some cases a protecting coating of either a more corrosion resistant metal (e.g., nickel, chromium, etc.) or one which is anodic to the substrate, e.g., zinc, is applied as by dipping, or by electrical means, e.g., plating, to a substrate of metal which is subject to electrochemical corrosion. For instance, a coating of a sacrificial metal such as zinc is sometimes used. Zinc protects steel because it is less corrosion resistant than steel. By corroding, the zinc galvanically protects the steel in contact so that it does not corrode under conditions where it would do so without the zinc coating.

The prevention of electrochemical corrosion by paint coatings is often practicable. Steel and other metals subject to electrochemical corrosion will corrode at a rate dependent on the supply of oxygen, water and ionic current. Paint coatings generally inhibit corrosion by limiting the ionic current as a result of their high resistance.

The cost of applying coatings, rated as cost per unit area per unit time of adequate protection, is increasing with greater labor costs. Since material cost is usually a minor fraction of total costs, more expensive coatings will be desirable if their life is sufficiently longer than less expensive coatings. Blast cleaning to white metal is required for the application of many modern coatings. This is an expensive procedure. The application of paint coatings to iron or steel surfaces, including the cost of paint and application costs, together with the surface preparation of steel when blast cleaned to white metal prior to applying surface coatings thereto, frequently costs about $1.00 per square foot.

The use of metallic foils, and also laminates of metal foils with other materials, for packaging of various products and articles is well known. In particular, laminates incorporating a metal foil are extensively used for food packaging, but the foil in this case is generally aluminum. Canadian Patent No. 814,402 of Fred B. Shaw, issued June 3, 1969, describes a laminated heat-sealable sheet made of a number of plies of flexible films, in which the first ply is of aluminum foil, the second ply is of a polyolefin resin bonded to one face of the aluminum foil, the third ply is a heat-sealable thermoplastic resin bonded to the other face of the aluminum foil, and the fourth ply is of regenerated cellulose coated on both sides with polyvinyl chloride; the latter ply is adhesively bonded to the polyolefin ply with a polyurethane resin primer. This laminated sheet is used as a flexible wrapper for packaging a variety of products. Other examples of sheet materials including a metal foil which are used for packaging are described in Canadian Patent No. 608,820 of Gonda et al., issued Nov. 15, 1960; U.S. Pat. No. 2,394,816 to Frank J. Soday, issued Feb. 12, 1946; and in Radtke et al, U.S. Pat. No. 3,719,551, issued Mar. 6, 1973.

It has also been proposed to employ metal sheet materials and laminates of metal foils with other materials as protective layers over metal surfaces, as for example, described in Canadian Patent No. 236,658 of J. H. Young, granted Dec. 25, 1923; Canadian Patent No. 583,367 of Bergstedt et al, issued Sept. 15, 1959; Bergstedt, U.S. Pat. No. 3,058,704, issued Oct. 16, 1962; and Canadian Patent No. 929,091 of Friese et al., issued June 26, 1973.

The foregoing proposals, when considered from the standpoint of providing practical corrosion protection to metal surfaces which are readily subject to electrochemical corrosion, e.g., iron or steel surfaces, suffer from one or more shortcomings. For instance aluminum foils and laminates including such foils are fairly brittle and may develop cracks and/or pin hole apertures. Also in some environments aluminum foil is readily corroded. The aluminum foil thus may soon cease to be a water and oxygen barrier, and the laminate material would become ineffective for preventing electrochemical corrosion of a metal substrate. Foils of copper, copper alloys and aluminum alloys are subject to the same defect. For the most part, known metal foil-containing laminates which have been used are not economical alternatives to paint coatings as protection for metal surfaces against electrochemical corrosion, because of relatively high cost of manufacture and/or application. Another drawback of certain laminate coating materials is that they are inconvenient to use for one or more reasons. For instance, that described by Bergstedt and Herr in Canadian Patent No. 583,367 requires activation of an adhesive layer by applying an appropriate solvent to render it tacky, or by applying heat thereto.

As previously stated, the use of paint or enamel coatings usually require considerable surface preparation of the metal, as for instance, blast cleaning to white metal in many instances, or in any event removal of loose rust, dirt, grease, and the like before applying the paint. The costs of such surface preparation are often quite significant; and since painting can be a time-consuming procedure, the labor costs are frequently considerable.

A broad objective of the present invention is to protect surfaces subject to deterioration by environmental factors, against such deterioration.

Another objective of the present invention is to provide a coating for metal surfaces subject to electrochemical corrosion, which is easy and inexpensive to apply, and requires very little if any surface preparation of the substrate metal.

Still another objective of the invention is to protect the hull of a wooden marine vessel against marine borers.

A further objective of this invention is the provision of a method of protecting a vessel's hull against fouling by marine organisms, such as algae and shellfish.

A still further objective of the invention is the protection of a marine vessel's hull both against electrochemical corrosion and against fouling by marine organisms.

To this end, we propose the use of a laminate consisting of a plastic film (which may be colored if desired for decoration) adhering by use of appropriate adhesive to a corrosion resistant metal, e.g., lead foil. On the other side of the foil is a coat of pressure sensitive adhesive covered with a layer of backing material having low adhesion to it to prevent the laminate from adhering to itself or to other objects before it is required.

This invention, in its broadest aspect, resides in a method of protecting against deterioration by environmental factors, a surface which is subject to said deterioration, which comprises applying to said surface a metal-plastic laminate comprising (a) a foil of corrosion-resistant metal, said foil having a thickness from about 1 to about 25 mils; (b) a plastic film of thickness ranging from 0 to about 20 mils, one surface of which is bonded to one surface of said metal foil; and (c) a coating of pressure-sensitive adhesive on the opposite surface of said metal foil; whereby said laminate is bonded to said surface by means of said pressure-sensitive adhesive.

The present invention, in another aspect, resides in a method for the protection against electrochemical corrosion of a metal substrate which is subject to said corrosion, said method comprising applying to said substrate a metal-plastic laminate comprising (a) a foil of corrosion-resistant metal, which foil has a thickness from about 1 to about 25 mils; (b) a plastic film of thickness ranging from 0 to about 20 mils, one surface of which is bonded to one surface of said metal foil; and (c) a coating of pressure-sensitive adhesive on the opposite surface of said metal foil; whereby said laminate is bonded to the surface of said substrate by means of said pressure-sensitive adhesive. Preferably the foil is of lead.

In another embodiment this invention resides in a method for protecting the hull of a vessel from fouling by marine organisms in addition to protecting it against electrochemical corrosion. This method comprises applying to said hull a metal-plastic laminate comprising (a) a foil of corrosion-resistant metal, which foil has a thickness ranging from about 1 to about 25 mils; (b) a plastic film of thickness ranging from 0 to about 20 mils, one surface of which is bonded to one surface of said metal foil; and (c) a coating of pressure-sensitive adhesive on the opposite surface of said plastic film, such that the laminate is bonded to the hull by means of said pressure-sensitive adhesive. A protective coating layer having anti-fouling properties is applied to the outer surface of the plastic film. Normally, but not necessarily, this layer is applied in the factory and included as part of the laminate.

In the drawings, which illustrate by way of example certain aspects of this invention:

FIG. 4 is a fragmentary cross-sectional view of the metal-plastic laminate as applied to a substrate in accordance with the present invention.

Figure 3:
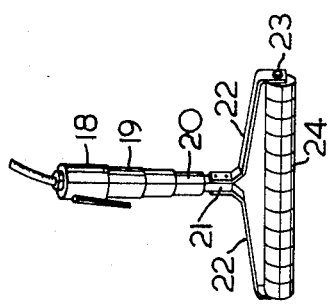
FIG. 3 is a perspective view of a pneumatic hammer-roller tool that may be used in applying and pressing firmly into place the metal-plastic laminate in accordance with this invention.

The plastic film which is secured to one side (i.e., the outer side) of the metal foil in the laminate can be composed of any of a wide variety of plastic materials. Examples of such materials as may be employed for the purpose are:

(i) polyolefins such as polyethylene or polypropylene, and copolymers of ethylene and/or propylene with other alpha-olefins or with other ethylenically unsaturated monomers;

(ii) polycarbonates;

(iii) polyacetals, such as that sold commercially under the trademark "Delrin";

(iv) polyesters, such as, for example "Mylar" (trademark), or "Dacron" (trademark);

(v) fluorocarbon polymers, such as those known by the trademarks "Kel-F" and "Teflon";

(vi) acrylic resins, for example poly(methyl acrylate), poly(ethyl acrylate), and poly(methyl methacrylate);

(vii) polyvinyl chloride;

(viii) vinylidene chloride polymers, e.g., saran;

(ix) cellulose acetate;

(x) polyvinyl acetals;

(xi) polystyrene;

(xii) copolymers of vinyl chloride or vinylidene chloride with other ethylenically unsaturated monomers;

(xiii) copolymers of acrylates or acrylonitrile with other ethylenically unsaturated monomers.

Where required, conventional plasticizers such as are described in *The Encyclopedia of Chemistry*, 2nd Edition, Clark and Hawley, Van Nostrand Reinhold Company (1966), pp. 838–840; or in *Modern Plastics Encyclopedia*, McGraw-Hill, Inc., may be included in the plastic film.

Any of a wide variety of adhesive materials may be used for bonding together the plastic film and the metal foil. Suitable for this purpose are the following:

(1) Nitrile rubber based adhesives, such as that known under the trademark "Pliobond 30" — a solution of nitrile rubber modified with a phenolic resin;

(2) Natural rubber and/or synthetic rubber-based adhesives such as those disclosed in U.S. Pat. No. 3,058,704 of Milton A. Bergstedt;

(3) Epoxy resins;

(4) Copolymers of olefins, e.g., ethylene, with ethylenically unsaturated polar compounds, e.g., vinyl or acrylic compounds — for instance, acrylic acid-/ethylene copolymers or vinyl acetate/ethylene copolymers.

In general, any adhesive material known to be useful in bonding a metal surface to a plastic surface may be used, the choice being left to the discretion of the user. For a further discussion of adhesive materials from which an appropriate choice may be made reference is made to *Handbook of Adhesives,* Irving Skeist, Editor (Reinhold Publishing Corp.), 1962, and Chapter 10 of the *Handbook of Plastics and Elastomers,* Harper, (1975), McGraw-Hill Book Co. See also H. E. Howe and S. F. Radtke, "How to Join Lead with Adhesives", *Adhesives Age,* Sept. 1968. The method disclosed in U.S. Pat. No. 3,607,614, MacKay, issued Sept. 21, 1971, is satisfactory for adhering plastic film to lead foil.

We wish, however, to emphasize at this point that an adhesive is not always required to join the metal foil to the plastic film; since often the plastic film when hot can be extruded onto the metal, under appropriate conditions of temperature and pressure, that no separate adhesive is required, such as is described, for instance, in U.S. Pat. No. 3,505,143 of Haas et al. This is referred to as "extrusion-lamination" or "extrusion-coating".

Lead is the preferred metal for use in the laminates employed in the present invention, for most applications. It is more suitable in most instances than, for instance, aluminum because of its malleability and resistance to corrosion. Lead is among the most corrosion resistant of common metals for the environments normally encountered and for the applications contemplated for our laminates. The lead foil in the laminate lends strength to the laminate and renders it impervious to vapors and liquids. In the thickness required for making the foil, the cost of the unprocessed lead is less than 20 cents per square foot, the actual cost being dependent on the thickness of foil. Also, in these days when recycling is given such prominence, it is of some significance that the laminate of this invention can be readily stripped from a metal surface and the lead recovered.

The thickness of lead foil which may be used, can range from about 1 to about 25 mils. Preferably the thickness of lead is 5-6 mils (0.005 inch to 0.006 inch). Although there may be special circumstances where greater thicknesses of lead would be desirable or necessary, usually thicknesses of lead much greater than this would be generally not necessary, and wasteful. The plastic film thickness may range from 0 to about 20 mils. (In some cases the outer plastic film can be omitted). Total thickness of the entire laminate may range from about 1 to about 50 mils.

In some cases, however, other metals may be substituted for lead. For example, if the laminate is, or is likely to, come into contact with food or potable water, aluminum may be used as the metal. In other specialty applications copper, gold or platinum may be preferred.

An unbroken lead foil of adequate thickness is a complete barrier to oxygen and water transmission except at edges or seams. With water and oxygen excluded, corrosion of an iron or steel surface covered by the laminate could not proceed. The laminate may be rolled onto the metal substrate, which should not require blast cleaning, forming a protective film adhering to the substrate. Seams can be protected with a bead of paint, considerable overlap, or both. The substrate, whether metal or not, should be free of grease and non-adherent material. The laminate can be applied over rust provided that the rust adheres strongly to the steel. Powdery rust should be removed from the substrate before the laminate is applied thereto.

As pressure-sensitive adhesives to be applied to the side of the metal foil which is to be bonded to the substrate there may be used any adhesive material commonly known and used for this purpose, for example, polyvinyl ethers; polyvinyl esters; and rubber based adhesives, e.g. those comprising styrene-butadiene or butadiene-acrylonitrile copolymers compounded with liquid or solid resin tackifying agents. Suitable pressure-sensitive adhesives for this purpose are those described in Bergstedt, U.S. Pat. No. 3,058,704, issued Oct. 16, 1962; Kinney, U.S. Pat. No. 2,754,240, issued July 10, 1956; Britton, U.S. Pat. No. 3,582,452, issued June 1, 1971; rubber acrylic ester copolymers as described in U.S. Pat. No. 3,600,268 of Hori et al., issued Aug. 17, 1971; and the adhesive described in U.S. Pat. No. 2,226,589 of W. H. Smyers, issued Dec. 31, 1940.

As the backing material which is applied to the coat of pressure-sensitive adhesive and is then stripped off before applying the laminate to the desired substrate, paper coated with polyethylene may be used. Other suitable backing materials are papers, preferably of high density, such as highly calendered Kraft, parchment and the like, on which a uniform release coating is applied, e.g., stearato chromic chloride, silicones, wax modified varnishes and the like.

The metal-plastic laminates employed in the present invention have a flexibility such that the laminate is capable of being wrapped around a roller of 3 inch diameter without cracking either the lead or the plastic film or breaking the adhesive bond between them. In addition the laminates provide total water-and-vapor proofness except at seams, as determined by ASTM Method D-1653.

To summarize the nature of the laminate and its application (referring here to FIG. 4 of the drawings) the laminate employed in this invention comprises (1) a pressure-sensitive adhesive, as previously discussed, (2) a corrosion-resistant metallic foil, usually of lead, and (3) a plastic film. It is essential that a pressure-sensitive adhesive be included in the laminate, and the corrosion-resistant metal foil is likewise an essential component of the laminate. The plastic film, on the other hand, may or may not be included. If present, the plastic film is bonded to the surface of the metal foil opposite that to which the pressure-sensitive adhesive is secured. The laminate is bonded or secured to the substrate to be protected from the environment by means of the pressure-sensitive adhesive. Thus, the pressure-sensitive adhesive constitutes the inner layer of the laminate, the metal foil is the intermediate layer (or in some cases may be the outer layer), and the plastic film is an outer layer. A further layer of an anti-fouling coating may also be included if required, as more fully discussed hereinafter; if present, this would be the outermost layer of the laminate. The substrate may be the surface of any object or structure requiring protection from the elements, and may be metallic or non-metallic; however the invention has particular application to the protection of metallic substrates of a type which is subject to electrochemical corrosion, viz. iron or steel objects or structures.

A principal application contemplated for lead-plastic laminates according to the present invention is over metal surfaces which are to be exposed to the atmosphere where the surfaces are not highly irregular in shape. However, the laminate also has underwater applications.

The fouling of the hulls of marine vessels by marine growths has for centuries presented a serious problem. Animal growths such as barnacles and plant life such as marine grass and algae attach themselves firmly to the hulls of ships and boats. On ships these growths increase the resistance to movement of the ship through the water thereby decreasing its speed and increasing the amount of fuel required for power. On motor boats and sail boats, the speed is likewise reduced. Many thousands of dollars are spent each year in removing marine growths from the hulls of boats and ships and in efforts to protect the hulls from fouling.

At present, the principal method used to inhibit the fouling of marine vessels by marine growths is to paint the underwater portion of the hull with an anti-fouling paint: Such paints customarily contain copper compounds, mercury compounds or other compositions that are poisonous to barnacles and other marine growths. However, such paints have been found to be of limited effectiveness. Their anti-fouling life depends on several factors such as type and thickness of coating of said paints, water temperature, and the proportion of time the ship spends at dock. In particular, the length of time during which protection is afforded can be relatively short, for example only a few months in warmer waters where the marine growths grow more rapidly. The vessel must then be taken out of the water to have its hull cleaned and repainted. This is an expensive operation particularly in the case of large ships, because of the drydock costs, not to mention the loss of income incurred because the ship is out of operation.

The present invention constitutes a significant improvement in this area because it not only provides effective anti-fouling protection against marine organisms but also provides effective protection of a ship's hull against corrosion, and provides these functions at lower costs of production and application. The lead-plastic laminate of this invention is relatively quickly and easily applied, and can be used by small boat-owners as well as on ships. The antifouling layer would normally, but not necessarily, be part of the laminate as its outermost layer, with said layer being applied in the factory with quality control.

The use of a lead-plastic laminate in accordance with the present invention, which includes a pre-applied pressure-sensitive adhesive, allowing as it does factory control and high production rates, provides significantly improved economies in providing practical protection of the hulls of ships and other vessels, and as such represents a significant advance in the art. The laminate may be applied under more unfavourable weather conditions that would be suitable for paint application. However, it is recommended that the laminate not be applied over a wet surface or over frost. The laminate itself is produced in the factory with weather control, and only the final application is subject to uncertain weather conditions, in contrast to painting where any step may be adversely affected by weather.

A brief description of an exemplary manner in which the laminates employed in this invention may be made will now be given, with reference to FIG. 1.

Figure 1:
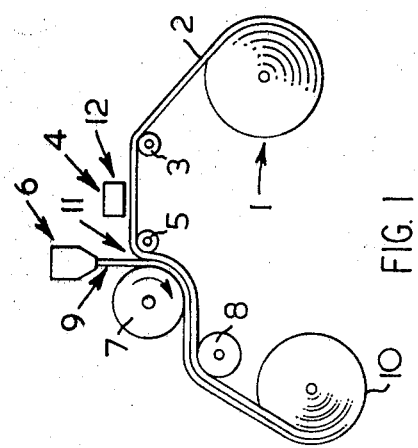
FIG. 1 is a schematic illustration of apparatus suitable for joining the outer plastic film to the lead foil in making laminates suitable for use in this invention.

Referring now to FIG. 1 of the drawings, a supply of lead foil 2 is mounted on the unwind roll 1 and fed off over support roll 3 to the primary station 12 where it is preheated by preheater 4. At coating station 11 the plastic layer 9 from extrusion die 6 joins the foil and is adhered to it. After passing between pressure roll 5 and chill roll 7, the laminate supported by support roll 8 is wound onto rewind roll 10.

Another method of joining plastic film and metal foil which can be used for making metal-plastic laminates suitable for the invention is that described in U.S. Pat. No. 3,323,965 of Hanle et al., issued June 6, 1967. In this method a supply of metal foil is delivered from a supply roll, passes over an idler roll and is then preheated. A film of extruded plastic material is brought into juxtaposition with the heated metal foil and the laminate is subjected to the action of an electrostatic charging device. The electrostatic charges produce a tight continuous bonding between the plastic film and the metal foil. The laminate is then cooled.

A layer of adhesive, if required, may be applied to either lead foil 2 or to the extruded plastic layer by any appropriate means, for instance, by a reverse roll coater, knife coater or any other commonly used clearance coaters suitable for spreading the adhesive uniformly to assure a coating of even thickness, as is well known in the art: see, for example, the apparatus as described in Canadian Pat. No. 811,065 of Labombarde, issued Apr. 22, 1969; as an example of apparatus certain features of which could be adapted to the application of adhesive coatings to the metal foil and/or plastic film of the laminates, used in the present invention. The pressure-sensitive adhesive and backing material can be applied to the reverse side of the lead foil by any known means. An appropriate way of doing this would be by a process similar to that illustrated in FIG. 1 of Canadian Pat. No. 583,367 of Bergstedt and Herr.

The metal-plastic laminates may be applied to the substrate by any appropriate means. A preferred way of doing this is by rolling. The minimum essential equipment for this purpose is a holder for holding a roll of predetermined width of the laminate or tape (similar in principle to a bathroom tissue holder but of course larger), and a roller squeezer for pressing the laminate against the surface of the substrate and squeezing out air, for example, an elastomer-covered rotatable roller mounted on a handle.

Figure 2:
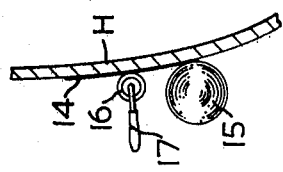
FIG. 2 is a schematic illustration of the method of this invention.

An illustration of this method as applied to the hull of a marine vessel is given in FIG. 2. As the laminate 14 is unrolled from roll 15 it is pressed onto the hull H by means of a pressure roller 16 having a handle 17. The roller 16 is preferably formed of neoprene or other elastomeric material so that it conforms closely to the hull of the vessel and presses the metal-plastic laminate into firm contact with the hull throughout the area of the laminate. Roller 16 is preferably coated with a silicone compound or other non-adhesive coating so that it has no tendency to stick to laminate 14.

The method could also be carried out by other than purely manual operation, employing (1) a holder for the laminate roll, (2) a means of automatically removing and winding on another roll the backing material, and (3) a means of applying pressure to the substrate automatically.

The metal-plastic laminates may also in certain cases, in accordance with this invention, be put in place on the substrate (depending on the type of substrate) by spiral or lapped application. For instance, if the substrate to be protected is a generally cylindrical metal body such as a metal pipe, tank, supporting rod, column, etc., the laminate may conveniently be applied in a spiral or lapped pattern.

If the metal-plastic laminates are, in accordance with this invention, to be used for protecting metal pipes, as for instance in a pipeline, known apparatus for applying tape to underground pipelines can, with suitable adaptation, be used to apply to the pipe metal-plastic laminates according to the present invention.

Referring now to FIG. 3 of the drawings, the tool 18 can desirably be used to press strips of the metal-plastic laminate firmly into place upon the substrate. Said tool 18 essentially comprises a conventional pneumatic hammer device 19 carrying a vibratory chuck 20 into which there is detachably secured a shank 21 carrying a pair of oppositely directed brackets 22 between which a rod 23 is affixed, the rod 23 carrying a composite roller 24 formed by a number of individual soft rubber disks.

After application of the strips of laminate onto the substrate, following removal of the backing material, the roller 24 is pressed onto the strips and rolled thereover; and simultaneously the hammer device 18 is operated so that the roller 24 generally hammers or pounds the strips at a high rate as it rolls thereover; whereby the desired firm pressing of the strips onto the substrate is automatically effected.

Several successful tests of the present invention have been conducted. In the experiments where the laminate alone provided the protection against corrosion, the steel was given no surface preparation. The mill scale remained; but the edges of panels had been ground and rounded and were polished.

SEA AND FRESH WATER IMMERSION

Mild steel panels, 4 inches × 3 inches, were used. Lacking the laminate at this time, lead foil about 5 mils thick was adhered to each side of a panel with about 1/16 inch overlap at the edges. A neoprene contact cement was used as an adhesive in this case. On half of each side of the lead coated panel was painted with an aluminum pigmented acrylic coating. The other half was painted with the same acrylic material except that it was unpigmented. The boundary between the two types of coatings was parallel to the shorter edges.

One of these panels after being immersed in sea water for 36½ months was removed and the edge bared of foil and adhesive. Although the hook of the panel, (which had been coated with the aluminum acrylic paint) had corroded through at the water line, no corrosion of the panel itself was observed, and in fact the edge which had been ground was still polished.

One of the panels which had been immersed in fresh water for about 47 months also had a polished edge where the foil and adhesive had been removed. Again no corrosion was observed. There were large blisters in the unpigmented topcoat and adhesion to lead had been considerably reduced, but the pigmented topcoat was unblistered and adhered well to the foil.

PANEL BURIED IN VEGETABLE GARDEN

For this experiment, a laminate was produced in the laboratory. Household saran film was glued to lead foil sheet, using as an adhesive, a solution of polyvinyl butyral (Union Carbide SYHL) in isopropanol. A pressure sensitive adhesive was made up consisting of a solution of polyvinyl ether (Union Carbide EDBC) in mineral spirits and toluene.

The laminate was wrapped around a 4 inches × 3 inches mild steel panel so that the whole panel was covered. Seams and the junction of the hook with the panel were sealed with an aluminum pigmented acrylic paint.

The panel was buried in a vegetable garden in Victoria, B.C., Canada, on 24th November and was removed 21st April of the following year. This was a rainy period in Victoria. Although the hook was well corroded, no corrosion was observed on the panel when the laminate was removed.

PANELS EXPOSED TO MARINE ATMOSPHERE

Panels were prepared in a similar manner to those for underwater immersion except that 6 inch × 4 inch panels were used and the boundary between pigmented and unpigmented top coatings was parallel to the longer edges.

The panels were exposed on racks facing south and about 50 ft. from the sea. After about 47 months, no corrosion was observed where the foil was removed from a panel.

USE OF THE LAMINATE IN PROTECTING CORROSION PRONE AREAS

In these experiments, the laminate used was 3M tape which consisted of lead 3 inches wide and about 4 mils in thickness with pressure sensitive adhesive on one side but no outer plastic film.

Some areas are difficult to protect with paint coatings. For example, corrosion often starts at sharp edges or points on structures and develops there at a greater rate than elsewhere. If the tape is wrapped around the edge prior to painting, the edge may be protected.

Where appendages are welded to a vertical steel surface, e.g., on a ship's superstructure, corrosion may develop at the welded junction resulting in unsightly rust staining below the junction. Such junctions could be sealed with lead tape. Pieces of steel were welded to 6 inches × 4 inches mild steel panels. With some panels, lead tape was applied over the welded junction on both sides of the steel shape prior to application of an alkyd paint system. With other similar panels the tape was omitted.

Since the panels were exposed on the marine atmospheric exposure racks at 45° to the ground, water collected in the pocket formed between the panel and the steel shape. After 16 months' exposure there was no corrosion on the weld area on the lower part of the shape with the taped panels. Water could not collect here. In the case of the untaped panels, there was corrosion in this area. At the welded portion in the pockets, there was corrosion with both experimental panels and controls; but in some cases it was more severe immediately adjacent to a tape boundary. It appeared that there may have been galvanic corrosion induced by the dissimilar metals, lead and steel, in contact.

USE OF THE LAMINATE IN REPAIRING SMALL DEFECTIVE AREAS IN PAINT COATINGS

Where there is corrosion in a small area, on a painted steel surface, the laminate may be used for repair.

Steel panels were coated with an alkyd system. Then a circular area of one inch diameter was blast-cleaned to the bare steel. Rust was deliberately induced at the bare area by application of a solution containing ferrous sulphate, ammonium sulphate and sodium chloride. On one set of panels, the loose rust was removed with a wire brush and the bare area repainted with the alkyd paint system. With the other set, a piece of the 3M lead tape about 3 inches × 3 inches was adhered to the panel covering the rusted area and overlapping about equally at all points around the rust spot. Then the alkyd paint system was applied over the tape. The panels were exposed on the atmospheric exposure racks.

After 21 months' exposure, there was no evidence of corrosion showing through in the taped panels. There was moderate corrosion evident on the untaped panels.

PANELS WITH LAMINATE INCLUDING ANTIFOULING PAINT ATTACHED TO BILGE KEEL OF AN ACTIVE DESTROYER

In this experiment, the 3M tape was used (3 inches width). It was wrapped around 6 inches × 4 inches mild steel panels so that it covered the whole panel except for the corners where there were holes for screwing the panel on to the bilge keel of the active destroyer. There was about ½ inch overlap of one tape over the adjacent tape. The untaped corners were protected with the standard ships' bottom paint system. A coat of standard vinyl antifouling paint was sprayed on to the tapes before they were attached to the panels. Seams between rows of tapes were protected with two coats of aluminum acrylic paint followed by two coats of vinyl antifouling paint. In one set of panels (system 1) the rows of tape were attached parallel to the longer axis which would also be parallel to the water surface when attached to the ship. The other 2 sets (systems 2 and 3) were identical except that as mounted on the ship one was upside down relative to the other. On these sets the tape was mounted parallel to the shorter axis of the panels, i.e., at right angles to the water surface as mounted on the ship. With one of these two sets, there would be a greater tendency towards lifting of a foil by the motion of the ship relative to the water than with the other set.

The panels were removed temporarily and examined after the ship had been afloat between nine and ten months. On no panel was there any lifting of foil, and except as the screw holes at the corners there was no corrosion observed. Also they were unfouled by marine organisms.

In addition to the uses previously mentioned the metal-plastic laminates can find use, in accordance with this invention, as a roofing material, and for covering siding and window frames for houses and other buildings. In such cases, the outer plastic film of the laminate could be colored as desired. The laminate can also find use in repairing small defects on a painted surface and for giving extra protection for corrosion-prone areas of painted surfaces, e.g., sharp edges, and over welds in some cases.

Although this invention has been described in some detail herein, it is to be understood that the invention is not to be limited to what has been specifically described. Other variations and modifications of the method of this invention will suggest themselves to those skilled in the art. It is therefore intended that the invention be limited only by the scope of the claims which follow.

We claim:

1. A method for protection against electrochemical corrosion of a metal substrate which is subject to said corrosion, said method comprising applying to said substrate a metal-plastic laminate comprising (a) a foil of corrosion-resistant lead, said foil having a thickness from about 1 to about 25 mils; (b) a plastic film of thickness ranging from 0 to about 20 mils, one surface of which is bonded to one surface of said metal foil; and (c) a coating of pressure-sensitive adhesive on the opposite surface of said lead foil; whereby said laminate is bonded to the surface of said substrate by means of said pressure-sensitive adhesive.

2. A method as in claim 1 wherein the metal substrate is iron or steel.

3. A method which comprises applying to the hull of a marine vessel a metal-plastic laminate comprising (a) a foil of corrosion-resistant lead, said foil having a thickness from about 1 to about 20 mils; (b) a plastic film of thickness ranging from 0 to about 20 mils, one surface of which is bonded to one surface of said metal foil; and (c) a coating of pressure-sensitive adhesive on the opposite surface of said foil, the laminate being bonded to said hull by means of said pressure-sensitive adhesive; and (d) applied to the outer surface of said plastic film, a protective coating layer having anti-fouling properties; whereby the hull of said vessel is protected both against electrochemical corrosion and against fouling by marine organisms.

4. A method as in claim 1 wherein the laminate is applied by rolling it onto said metal substrate.

5. A method of protecting a steel marine vessel against electrochemical corrosion, which comprises applying to the hull of said vessel a metal-plastic laminate comprising (a) a foil of corrosion-resistant lead, said foil having a thickness from about 1 to about 25 mils; (b) a plastic film of thickness ranging from 0 to about 20 mils, one surface of which is bonded to one surface of said metal foil; and (c) a coating of pressure-sensitive adhesive on the opposite surface of said lead foil; whereby said laminate is bonded to said hull by means of said pressure-sensitive adhesive.

6. A method of protecting a wooden marine vessel against marine borers and fouling organisms which comprises applying to the hull of said vessel a metal-plastic laminate comprising (a) a foil of corrosion-resistant lead, said foil having a thickness from about 1 to about 25 mils; (b) a plastic film of thickness ranging from 0 to about 20 mils, one surface of which is bonded to one surface of said metal foil; (c) a coating of pressure-sensitive adhesive on the opposite surface of said metal foil; and (d) a protective coating layer having anti-fouling properties applied to the outer surface of said plastic film; whereby said laminate is bonded to said hull by means of said pressure-sensitive adhesive.

7. A method as set forth in claim 1 wherein the plastic film is bonded to said one surface of the lead foil by extrusion lamination.

8. A method as set forth in claim 6 wherein the plastic film is bonded to said one surface of the lead foil by extrusion lamination.

9. A method as set forth in claim 3 wherein the plastic film is bonded to said one surface of the metal foil by extrusion lamination.

10. A method as in claim 1 wherein the plastic film is adhesively secured to said one surface of the metal foil.

11. A method as in claim 6 wherein the plastic film is adhesively secured to said one surface of the lead foil.

12. A method as in claim 3 wherein the plastic film is adhesively secured to said one surface of the lead foil.

13. A method as in claim 5 wherein the laminate is applied by rolling it onto said hull.

14. A method as in claim 6 wherein the laminate is applied by rolling it onto said hull.

15. A method as in claim 5 wherein the plastic film is bonded to said one surface of the lead foil by extrusion lamination.

16. A method as set forth in claim 1 wherein the lead foil has a thickness of 5–6 mils.

17. A method as set forth in claim 6 wherein the lead foil has a thickness of 5–6 mils.

18. A method as defined in claim 1 wherein the plastic film is omitted from the laminate.

19. A method as defined in claim 6 wherein the plastic film is omitted from the laminate.

20. A method as defined in claim 1 wherein the plastic film is saran.

21. A method as defined in claim 6 wherein the plastic film is saran.

22. A method as defined in claim 1 wherein the pressure-sensitive adhesive is a polyvinyl ether.

23. A method as defined in claim 6 wherein the pressure-sensitive adhesive is a polyvinyl ether.

24. A method as defined in claim 1 wherein saran film is secured to one surface of said lead foil by means of polyvinyl butyral adhesive.

25. A method as defined in claim 6 wherein saran film is secured to one surface of a lead foil by means of polyvinyl butyral adhesive.

26. A method as defined in claim 5 wherein saran film is secured to one surface of said lead foil by means of polyvinyl butyral adhesive.

27. A method as in claim 6 wherein the laminate is applied by rolling it onto said surface.

28. A method as set forth in claim 1 wherein the substrate to be protected is a generally cylindrical metal body, and the lead-plastic laminate is applied thereto in a spiral pattern.

29. A method as set forth in claim 6 wherein the substrate to be protected is a generally cylindrical metal body, and the metal-plastic laminate is applied thereto in a spiral pattern.

30. A method as in claim 5 wherein the plastic film is adhesively secured to said one surface of the lead foil.

31. A method as defined in claim 5 wherein the plastic film is omitted from the laminate.

32. A method as defined in claim 5 wherein the plastic film is saran.

* * * * *